Sept. 18, 1962  S. GOLTEN  3,054,233
CRANKSHAFT GRINDERS
Filed July 5, 1960
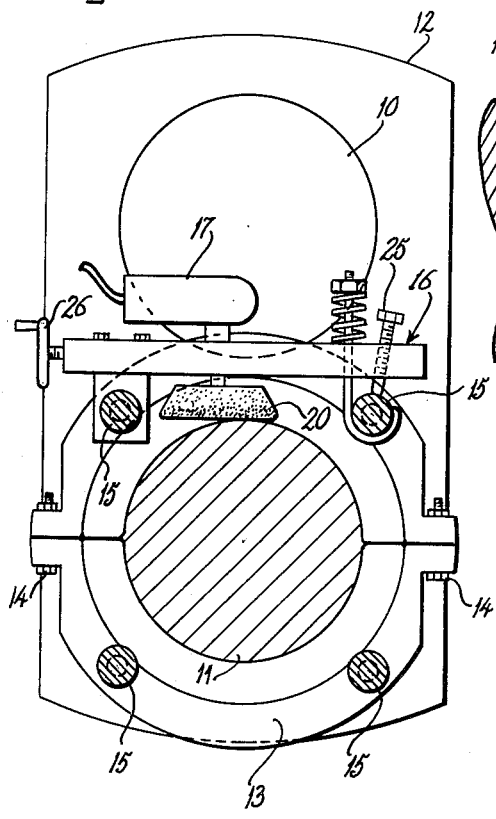
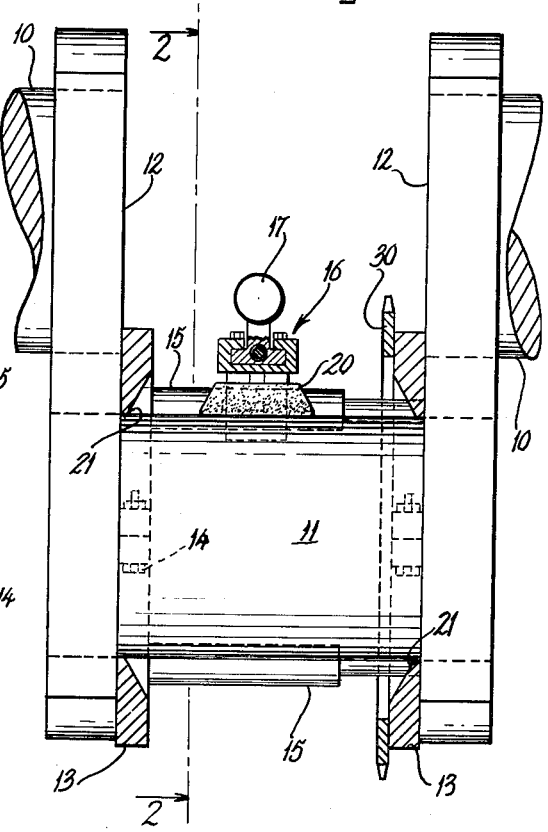
INVENTOR
Sigurd Golten
BY Edwin S. Hall
ATTORNEY United States Patent Office 3,054,233
Patented Sept. 18, 1962

3,054,233
CRANKSHAFT GRINDERS
Sigurd Golten, 210 Pines Lake Drive East,
Wayne County, N.J.
Filed July 5, 1960, Ser. No. 40,882
1 Claim. (Cl. 51—241)

This invention relates to crankshaft journal grinders. The principal object of the invention is to provide improved means for regrinding main and crankpin journals in large marine engines without removing the crankshaft from the engine and without laying up the ship for more than a few days.

A forged or cast crankshaft consists of a series of main and crankpin journals connected by fillets to flanges or crankcheeks. A shrunk crankshaft consists of a series of main and crankpin journals shrunk into holes in the crankcheeks, the fillets being quite small or nonexistent. In practice a journal bearing contacts only the central portion of the journal, the ends of the bearing being chamfered to provide clearance so that they do not ordinarily touch narrow ring areas of the journal adjacent the flanges or crankcheeks. When the journal becomes worn or scored, these ring areas remain undamaged. An object of this invention is to use the undamaged ring areas including the fillets if any, as the reference surfaces in regrinding crankshaft journals, to insure that the refinished journal shall be precisely coaxial with the original journal. Another object is to provide guide shoes contacting substantially the entire circumference of the narrow ring areas of the journal adjacent the flanges or crankcheeks to insure that the refinished journal shall be precisely coaxial with the original journal even tho the narrow ring areas may have been worn out of round or otherwise locally damaged.

These and other objects of the invention will be apparent from the following specification in connection with the drawings in which FIG. 1 is an elevational view of a crankshaft with axial sectional view of the invention; FIG. 2 is a transverse sectional view taken on the line 2—2 of FIG. 1.

Briefly described, the invention consists of a grinding mechanism having a cupwheel mounted on a pair of plates operably riding on the narrow ring areas adjacent the crankcheeks at the ends of a crankshaft journal, the plates operably contacting substantially the entire circumference of the narrow ring areas.

Referring to the drawings, crankshaft 10 has journal 11 shrunk into flanges 12. At each end of journal 11, plate 13 is operable on the narrow ring area 21 adjacent flange 12. Plate 13 is split into two or more parts to permit assembly on the journal, the parts being held together by any convenient means such as bolts 14. The two plates 13 are spaced apart and connected by telescopic rods 15.

Mounted on rods 15 is the grinding assembly consisting of carriage 16, motor 17, and grinding cupwheel 20. Carriage 16 may be moved axially on rods 15 to permit cupwheel 20 to traverse the full length of journal 11. Cupwheel 20 may be moved tangentially to journal 11 by carriage handwheel 26. Feed screw 25 may be backed off to allow cupwheel 20 to come into grinding contact with journal 11. The entire grinding assembly may be rotated about journal 11 more than a full revolution by sprocket wheel 30 and a chain (not shown).

In operation the grinding mechanism is operably mounted with the plates 13 operably contacting the narrow ring areas 21. Motor 17 may be driven by air or by an electric current. Cupwheel 20 is fed into grinding contact with journal 11 by feed screw 25 and may be moved tangentially by handwheel 26 and rotated about journal 11 by sprocket wheel 30 until one end of journal 11 has been reground, whereupon the grinding assembly may be moved axially on rods 15 into position to regrind the other end of journal 11.

Having thus described the invention and its operation, it is clear that the objects thereof as stated have been attained in a practical manner. While a specific embodiment of the invention has been shown and described, it is understood that changes may be made in the construction and arrangement of the shoes contacting the narrow ring areas at the ends of the journal, and of other portions of the mechanism, without departing from the spirit or scope of the invention as expressed in the following claim.

I claim:

In connection with an engine having a crankshaft including a journal connecting two flanges, a mechanism for regrinding said journal without removing the crankshaft from the engine, said mechanism comprising a pair of plates operably contacting the entire circumference of narrow end areas of said journal adjacent said flanges, rods connecting said plates, a carriage axially slidable on said rods, a motor mounted on said carriage, a grinding cupwheel carried by said motor, means for feeding said cupwheel into grinding contact with said journal and for moving said cupwheel in a plane parallel to the axis of said journal, and means for rotating said mechanism more than a full revolution relative to said journal.

References Cited in the file of this patent
UNITED STATES PATENTS

| | | |
|---|---|---|
| 2,151,139 | Morris | Mar. 21, 1939 |
| 2,238,646 | Indge | Apr. 15, 1941 |
| 2,447,117 | Emory | Aug. 17, 1948 |
| 2,520,025 | Beck | Aug. 22, 1950 |
| 2,599,954 | Tibbs | June 10, 1952 |
| 2,670,580 | Stiles | Mar. 2, 1954 |
| 2,761,261 | Sills | Sept. 4, 1956 |
| 2,937,479 | Golten | May 24, 1960 |